H. T. Romertze,
Bridle Bit,
N° 38,541.   Patented May 12, 1863
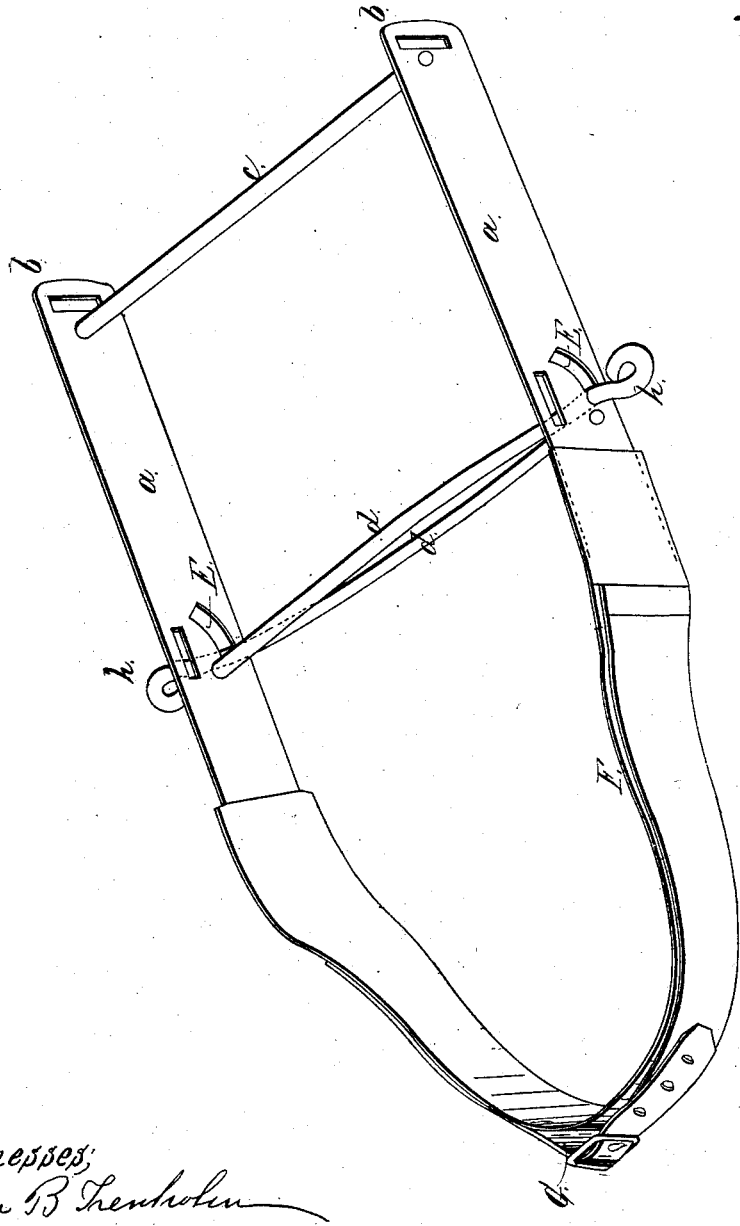
Witnesses:
John B Trenholm
John L. Hayes
Inventor;
Henry T. Romertze

UNITED STATES PATENT OFFICE.

HENRY T. ROMERTZE, OF PHILADELPHIA, PENNSYLVANIA.

IMPROVED ANATOMICAL BIT FOR HORSES.

Specification forming part of Letters Patent No. 38,541, dated May 12, 1863.

*To all whom it may concern:*

Be it known that I, HENRY T. ROMERTZE, of Philadelphia, in the county of Philadelphia, and in the State of Pennsylvania, have invented a new instrument, by me denominated "the anatomical bit," for the purpose of guiding, leading, and managing horses and other animals; and I do hereby declare that the following is a full and exact description thereof, reference being had to the accompanying drawings, and to the letters of reference marked thereon.

The nature of my invention consists and is based upon the anatomical construction of the of the horse's head, cheek-bones, nose-bones, and its respiratory organs, upon which parts my instrument operates, and by its functions makes the animal to conform to the will of the operator.

To enable others to make and use my invention, I will proceed to describe the construction of the said anatomical bit.

The instrument is composed of two flat bands—cheek-pieces (marked, respectively, $a$ $a$)—made of metal one-half inch (more or less) in width on either end, its length nine inches, (more or less,) the front part of which are formed according to the anatomical construction of horse's cheek-bones, the rear part of the said bands curb-like-shaped, the ends of which $b$ $b$ are secured by a cross steel bar, C. Between and in the middle of the cheek-bands $a$ $a$ there are two round bars, $d$ $d$, traversing each other, in which position one end of each bar is welded on either side in the center of the cheek-bands, and the other ends of each bar protrude through the opposite cheek-bands through a semicircular aperture, E E. The nose of the horse is encircled by two leather straps, F and G, placed one over the other and attached to the front ends of the cheek-bands. The strap F beneath is provided with slips or slides, and the upper strap, G, with a buckle, by which means it can be lengthened or reduced, according to the size and form of the horse's nose-bones. These cheek-bands $a$ $a$ are acted upon by means of a snaffle-rein, which is attached to either of the bar ends $h$ $h$, which protrude through the apertures E E, and by pulling either of the said bar ends the front part of either of the cheek bands $a$ $a$, to which one end of each bar is welded, produces a pressure upon the cheek-bones, and by increased pulling effects the respiratory organs of the horse's nose, by which means the animal is impelled to turn its head to whichever direction it may be required, and by pulling both bar ends simultaneously the locomotion of the animal can be diminished or entirely ceased. The two leather straps F and G operate also upon the horse's nose by the pulling of a curb-rein, which is attached to either of the rear cheek-band ends, $b$ $b$, by which means a tolerable manageable horse will more readily obey the will of the rider than with any other bridle now in use.

What I claim as my invention, and desire to secure by Letters Patent, is—

1. The construction of the two cheek-pieces, conformably, or nearly so, to the horse's cheek-bones, nearly in line with the upper lips of the nostrils, so that by stress upon the reins connected with the bars $d$ $d$ pressure may be applied first to the cheek-bones for the ordinary control of the animal, or, in case of restive horses, a further pressure may be made upon the nostrils, all in the manner and for the purpose described.

2. The straps F and G, constructed and arranged as described, in combination with the elastic cheek-pieces made to extend over the nostrils of the horse, for the purpose of controlling by pressure the respiratory organs of the animal.

3. The elastic cheek-pieces, provided with the oblique or semicircular slots, in combination the lever-bars $d$ $d$, constructed and arranged as described, and the bar C, made rigid or elastic, whereby I am enabled to control the animal by pressure upon the cheek-bones and eventually against the nostrils.

HENRY T. ROMERTZE.

Witnesses:
JOHN S. HOLLINGSHEAD,
WM. M. IRWIN.